(12) United States Patent
Woo et al.

(10) Patent No.: US 8,436,955 B2
(45) Date of Patent: May 7, 2013

(54) LIQUID CRYSTAL DISPLAY HAVING PAIRS OF POWER SOURCE SUPPLY LINES AND A METHOD FOR FORMING THE SAME

(75) Inventors: Hwa-Sung Woo, Asan-si (KR);
Dong-Gyu Kim, Yongin-si (KR);
Hyang-Yul Kim, Hwaseong-si (KR);
Joo-Nyung Jang, Hwaseong-si (KR);
Sung-Woon Kim, Suwon-si (KR);
Cheol Shin, Hwaseong-si (KR);
Dong-Chul Shin, Seoul (KR)

(73) Assignee: Samsung Display Co., Ltd., Yongin-city, Gyeonggi-do (KR)

( * ) Notice: Subject to any disclaimer, the term of this patent is extended or adjusted under 35 U.S.C. 154(b) by 259 days.

(21) Appl. No.: 13/035,313

(22) Filed: Feb. 25, 2011

(65) Prior Publication Data
US 2012/0013814 A1 Jan. 19, 2012

(30) Foreign Application Priority Data
Jul. 16, 2010 (KR) .......................... 10-2010-0069201

(51) Int. Cl.
*G02F 1/133* (2006.01)
*G02F 1/136* (2006.01)
*G02F 1/1333* (2006.01)
*G02F 1/1343* (2006.01)

(52) U.S. Cl.
USPC ................. 349/33; 349/42; 349/84; 349/146; 349/144

(58) Field of Classification Search .................... 349/33, 349/42, 84, 146, 144
See application file for complete search history.

(56) References Cited

U.S. PATENT DOCUMENTS

| 7,826,018 B2 * | 11/2010 | Kim et al. | 349/129 |
| 8,089,570 B2 * | 1/2012 | Kim et al. | 349/37 |
| 2011/0221988 A1 * | 9/2011 | Cho et al. | 349/41 |
| 2012/0038843 A1 * | 2/2012 | Jung et al. | 349/41 |

\* cited by examiner

*Primary Examiner* — Mike Qi
(74) *Attorney, Agent, or Firm* — F. Chau & Associates, LLC (57) ABSTRACT

A liquid crystal display wherein a first power source supply line and a second power source supply line are respectively applied with a first voltage and a second voltage having a predetermined magnitude, and a first power source supply line and a second power source supply line are disposed as a pair between a first pixel electrode and a second pixel electrode. The first voltage and the second voltage may have different polarities.

20 Claims, 8 Drawing Sheets

Frame (m)

Frame (m+1)

FIG. 7A

FIG. 7B es-LIQUID CRYSTAL DISPLAY HAVING PAIRS
OF POWER SOURCE SUPPLY LINES AND A
METHOD FOR FORMING THE SAME

CROSS-REFERENCE TO RELATED
APPLICATION

This application claims priority to Korean Patent Application No. 10-2010-0069201 filed on Jul. 16, 2010, the entire contents of which are incorporated herein by reference.

BACKGROUND OF THE INVENTION (a) Field of the Invention

The present invention relates to a liquid crystal display, and more particularly, to a liquid crystal display having pairs of power source supply lines and a method for forming the same.

(b) Discussion of the Related Art

A liquid crystal display (hereinafter referred to as an LCD) is one of the most widely used flat panel displays. The LCD includes two display panels provided with electric field generating electrodes, such as a pixel electrode and a common electrode. A liquid crystal layer is interposed between the two display panels. In the LCD, voltages are applied to the electric field generating electrodes to generate an electric field in the liquid crystal layer. Due to the generated electric field, liquid crystal molecules of the liquid crystal layer are aligned and polarization of incident light is controlled, thereby displaying images.

The LCD also includes switching elements connected to the respective pixel electrodes, and a plurality of signal lines such as gate lines and data lines for controlling the switching elements and applying voltages to the pixel electrodes.

The liquid crystal display receives an input image signal from an external graphics controller. The input image signal contains luminance information of each pixel PX of the LCD. The luminance information represents a given gray level. Each pixel is applied with the data voltage corresponding to the desired luminance information. The data voltage applied to the pixel is a pixel voltage that represents a difference between a reference voltage, such as a common voltage, and an image signal. Each pixel displays luminance representing a gray level of the image signal according to the pixel voltage. Here, the range of the pixel voltage that is capable of being used by the liquid crystal display is determined according to a driver.

The driver of the liquid crystal display is mounted on the display panel in a form of a plurality of IC chips, or is installed on a flexible circuit film and attached to the display panel. The cost of manufacturing the IC chip represents a high portion of the total manufacturing cost of the liquid crystal display. Particularly, the cost of manufacturing the driver of the liquid crystal display is increased as the number of data lines applying the data voltage is increased.

Also, to provide for adequate display quality of the liquid crystal display, should have a high contrast ratio, excellent viewing angle, and fast response speed.

SUMMARY OF THE INVENTION

Exemplary embodiments of the present invention provide for a liquid crystal display having a high contrast ratio, a wide viewing angle, a high response speed, and a reduced manufacturing cost of the driver of the liquid crystal display by decreasing the number of data lines and preventing deterioration of display quality that may be attributable to an irregular movement of the liquid crystal molecules.

A liquid crystal display according to an exemplary embodiment of the present invention includes a first substrate and a second substrate facing each other. A liquid crystal layer is interposed between the first and second substrates and including liquid crystal molecules. A gate line is formed on the first substrate. The gate line transmits a gate signal. A first data line and a second data line are formed on the first substrate. A first power source supply line and a second power source supply line are formed on the first substrate. A first switching element is connected to the gate line and the first data line. A second switching element is connected to the gate line and the first power source supply line. A third switching element is connected to the gate line and the second data line. A fourth switching element is connected to the gate line and the second power source supply line. A first pixel electrode is connected to the first switching element and the second switching element. A second pixel electrode is connected to the third switching element and the fourth switching element and is located adjacent to the first pixel electrode. The first power source supply line and the second power source supply line are applied with a first voltage and a second voltage having predetermined magnitudes, respectively. The first power source supply line and the second power source supply line are disposed as a pair between the first pixel electrode and the second pixel electrode.

The polarities of the first voltage and the second voltage may be different from each other.

The first pixel electrode may include a first sub-pixel electrode and a second sub-pixel electrode separated from each other. The second pixel electrode may include a third sub-pixel electrode and a fourth sub-pixel electrode separated from each other. The first sub-pixel electrode may be connected to the first switching element, the second sub-pixel electrode may be connected to the second switching element, the third sub-pixel electrode may be connected to the third switching element, and the fourth sub-pixel electrode may be connected to the fourth switching element.

The first sub-pixel electrode and the second sub-pixel electrode may each include a plurality of branch electrodes. The branch electrodes of the first sub-pixel electrode and the branch electrodes of the second sub-pixel electrode may be alternately disposed.

The first sub-pixel electrode may further include a stem connecting the plurality of branch electrodes of the first sub-pixel electrode. The stem may include a first stem disposed on the lower portion of the pixel electrode and a second stem disposed on the upper portion of the pixel electrode. The first stem and the second stem may be disposed on both sides of the pixel electrode. The first stem overlaps one of the first data line and the first power source supply line, and the second stem may overlap the other of the first data line and the first power source supply line.

The second sub-pixel electrode may further include a stem connecting the plurality of branch electrodes of the second sub-pixel electrode. The stem may include a third stem disposed on the lower portion of the pixel electrode and a fourth stem disposed on the upper portion of the pixel electrode. The third stem and the fourth stem may be disposed on both sides of the pixel electrode. The third stem may overlap one of the first data line and the first power source supply line, and the fourth stem overlaps the other of the first data line and the first power source supply line.

The first pixel electrode may have an opening that is not enclosed by the first stem, the second stem, the third stem, and the fourth stem.

The opening may be disposed on both sides of the center of the first pixel electrode.

The third sub-pixel electrode and the fourth sub-pixel electrode may each include a plurality of branch electrodes, and the branch electrodes of the third pixel electrode and the branch electrodes of the fourth sub-pixel electrodes may be alternately disposed.

If the gate line is applied with a gate on signal, the first sub-pixel electrode may be applied with a first data voltage through the first data line, the second sub-pixel electrode is applied with a first voltage through the first power source supply line, the third sub-pixel electrode may be applied with a second data voltage through the second data line, and the fourth sub-pixel electrode is applied with a second voltage through the second power source supply line. The polarities of the first data voltage and the second data voltage may be different from each other.

The liquid crystal display may further include a third data line close to the second data line and applied with a third data voltage and a third pixel electrode connected to the third data line. The second data line and the third data line may be disposed as a pair between the second pixel electrode and the third pixel electrode.

The second data voltage and the third data voltage may have different polarities.

A liquid crystal display according to an exemplary embodiment of the present invention includes a first substrate and a second substrate facing each other. A liquid crystal layer is interposed between the first and second substrates and including liquid crystal molecules. A gate line is formed on the first substrate. The gate line transmits a gate signal. A first data line and a second data line are formed on the first substrate. A first power source supply line and a second power source supply line are formed on the first substrate. A first switching element is connected to the gate line and the first data line. A second switching element is connected to the gate line and the first power source supply line. A third switching element is connected to the gate line and the second data line. A fourth switching element is connected to the gate line and the second power source supply line. A first pixel electrode is connected to the first switching element and the second switching element. A second pixel electrode is connected to the third switching element and the fourth switching element. The second pixel electrode is located adjacent to the first pixel electrode. The first data line is applied with a first data voltage, the second data line is applied with a second data voltage, and the first data line and the second data line are disposed as a pair between the first pixel electrode and the second pixel electrode.

The polarities of the first data voltage and the second data voltage may be different from each other.

The first power source supply line and the second power source supply line may be applied with a first voltage and a second voltage each having a predetermined magnitude, respectively. The first voltage and the second voltage may have different polarities.

According to an exemplary embodiment of the present invention, the liquid crystal display may simultaneously insure a high contrast ratio and a wide viewing angle. The response speed of the liquid crystal molecules may be fast. The number of data lines may be reduced such that the cost of the driver of the liquid crystal display may be decreased and the deterioration of the display quality that may be attributable to irregular movement of the liquid crystal molecules may be prevented.

BRIEF DESCRIPTION OF THE DRAWINGS

The above and other features and aspects of the exemplary embodiments of the present invention will be described in detail with reference to the accompanying drawings, in which.

DETAILED DESCRIPTION OF EXEMPLARY EMBODIMENTS

Exemplary embodiments of the present invention will be described more fully hereinafter with reference to the accompanying drawings. As those skilled in the art would realize, the described embodiments may be modified in various different ways, all without departing from the spirit or scope of the present invention.

In the drawings, the thickness of layers, films, panels, regions, etc., may be exaggerated for clarity. Like reference numerals may designate like elements throughout the specification. It will be understood that when an element such as a layer, film, region, or substrate is referred to as being "on" another element, it can be directly on the other element or intervening elements may also be present.

Hereinafter, a liquid crystal display according to an exemplary embodiment of the present invention will be described in detail with reference to the accompanying drawings.

Figure 1:
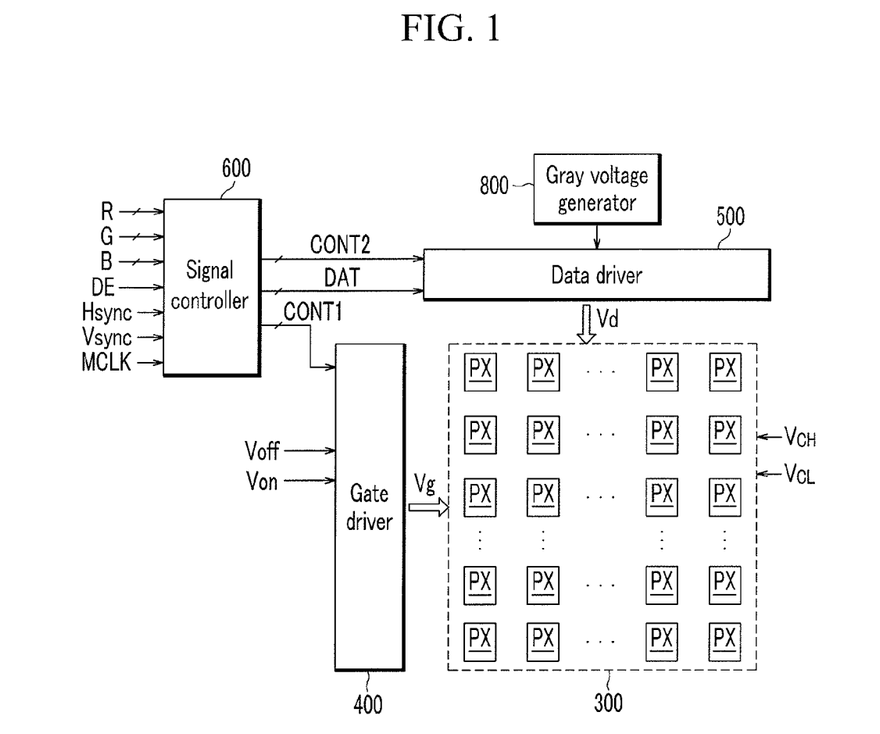
FIG. 1 is a block diagram of a liquid crystal display according to an exemplary embodiment of the present invention.
Figure 2:
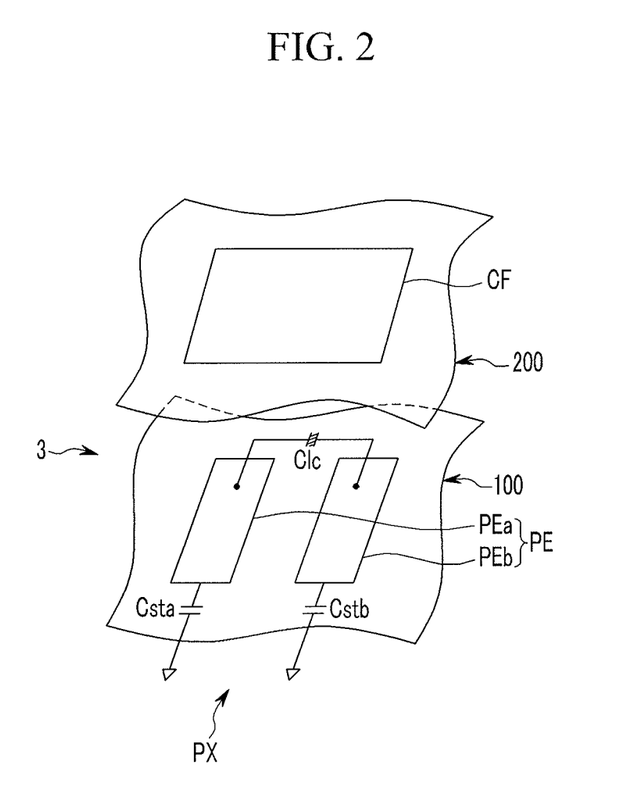
FIG. 2 is an equivalent circuit diagram showing a structure of a liquid crystal display and one pixel according to an exemplary embodiment of the present invention.

FIG. 1 is a block diagram of a liquid crystal display according to an exemplary embodiment of the present invention, and FIG. 2 is an equivalent circuit diagram showing a structure of a liquid crystal display and one pixel according to an exemplary embodiment of the present invention.

Referring to FIG. 1, a liquid crystal display according to an exemplary embodiment of the present invention includes a liquid crystal panel assembly 300, a gate driver 400, a data driver 500, a gray voltage generator 800, and a signal controller 600.

Referring to FIG. 2, the liquid crystal panel assembly 300 includes lower panel 100 and upper panel 200 facing each other, and a liquid crystal layer 3 therebetween.

A first pixel electrode PEa and a second pixel electrode PEb of the lower panel 100 serve as two terminals of the liquid crystal capacitor Clc, and the liquid crystal layer 3 between the first and second pixel electrodes PEa and PEb serves as a dielectric material. The first pixel electrode PEa is connected to a first switching element (not shown), and the second pixel electrode PEb is connected to a second switching element (not shown). The first switching element and the second switching element are respectively connected to a corresponding gate line (not shown) and data line (not shown).

The liquid crystal layer 3 has dielectric anisotropy, and liquid crystal molecules 31 (FIG. 3) of the liquid crystal layer 3 may be arranged such that their long axes are aligned perpendicular to surfaces of the two panels 100 and 200 when an electric field is not applied.

The first pixel electrode PEa and the second pixel electrode PEb may be formed of different layers or the same layer. First and second storage capacitors (not shown) serving as assistants of the liquid crystal capacitor Clc may be formed by overlapping separate electrodes (not shown) provided on the lower panel 100 and the first and second pixel electrodes PEa and PEb via an insulator interposed therebetween.

To produce a color image, each pixel PX uniquely displays one of the primary colors (spatial division), or each pixel PX temporally and alternately displays primary colors (temporal division). Then, the primary colors are spatially or temporally combined, and thus a desired color is recognized. An example of the primary colors may be three primary colors of red, green, and blue. One example of the spatial division is represented in FIG. 2, where each pixel PX is provide with a color filter CF indicating one of the primary colors on the region of the upper panel 200 corresponding to the first and second pixel electrodes PEa and PEb. Unlike what is shown in FIG. 2, the color filter CF may be formed on or below the first and second pixel electrodes PEa and PEb of the lower panel 100.

At least one polarizer (not shown) for providing light polarization is provided in the liquid crystal panel assembly 300.

Next, an operation of a liquid crystal display according to an exemplary embodiment of the present invention will be described with reference to FIG. 3 as well as FIG. 1 and FIG. 2.

Figure 3:
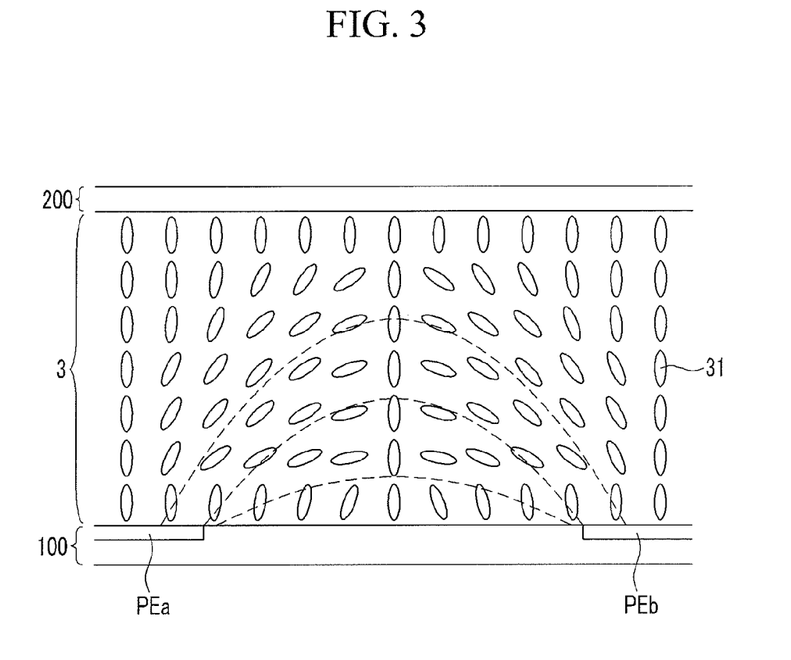
FIG. 3 is a schematic cross-sectional view of a liquid crystal display according to an exemplary embodiment of the present invention.

FIG. 3 is a schematic cross-sectional view of a liquid crystal display according to an exemplary embodiment of the present invention.

Referring to FIG. 2 and FIG. 3, if a data line or a common voltage line connected to a pixel is applied with the data voltage VCH or VCL, the data voltage is applied to the corresponding pixel PX through turned-on first and second switching elements by the gate signal. For example, the first pixel electrode PEa is applied with the first data voltage or the first voltage through the first switching element, and the second pixel electrode PEb is applied with the second data voltage or the second voltage through the second switching element. Here, the voltages applied to the first and second pixel electrodes PEa and PEb are data voltages corresponding to a luminance that is to be displayed by the pixel PX, and may have opposite polarities with respect to a reference voltage Vref.

The difference between the two data voltages that are applied to the first and second pixels PXa and PXb and have opposite polarities is expressed as a charged voltage of the liquid crystal capacitors Clc, i.e., a pixel voltage. If a potential difference is generated between two terminals of the liquid crystal capacitor Clc, as shown in FIG. 3, an electric field parallel to the surface of the display panel 100 and 200 is formed on the liquid crystal layer 3 between the first and second pixel electrodes PEa and PEb. When the liquid crystal molecules 31 have positive dielectric anisotropy, the liquid crystal molecules 31 are arranged such that the long axes thereof are aligned parallel to the direction of the electric field, and the degree of inclination is changed according to the magnitude of the pixel voltage. This liquid crystal layer 3 is referred to as an electrically-induced optical compensation (EOC) mode liquid crystal layer. Also, the extent to which the polarization of light passing through the liquid crystal layer 3 is changed depends upon the inclination degree of the liquid crystal molecules 31. The change of the polarization appears as a change of transmittance of the light by the polarizer, and accordingly, the pixel PX displays the desired predetermined luminance.

As described above, one pixel PX is applied with the two voltages having different polarities with respect to the reference voltage Vref such that the driving voltage may be increased, the response speed of the liquid crystal molecules may be fast, and the transmittance of the liquid crystal display may therefore be increased. Also, the polarities of the two voltages applied to one pixel PX are opposite to each other such that degradation of the display quality due to flicker may be prevented under driving types such as column inversion or row inversion, like dot inversion.

Also, when the first and second switching elements are turned off in one pixel PX, the voltages applied to the first and second pixel electrodes PEa and PEb are decreased by a kickback voltage such that the charging voltage of the pixel PX is little changed. Accordingly, the display characteristics of the liquid crystal display may be increased.

Figure 4:
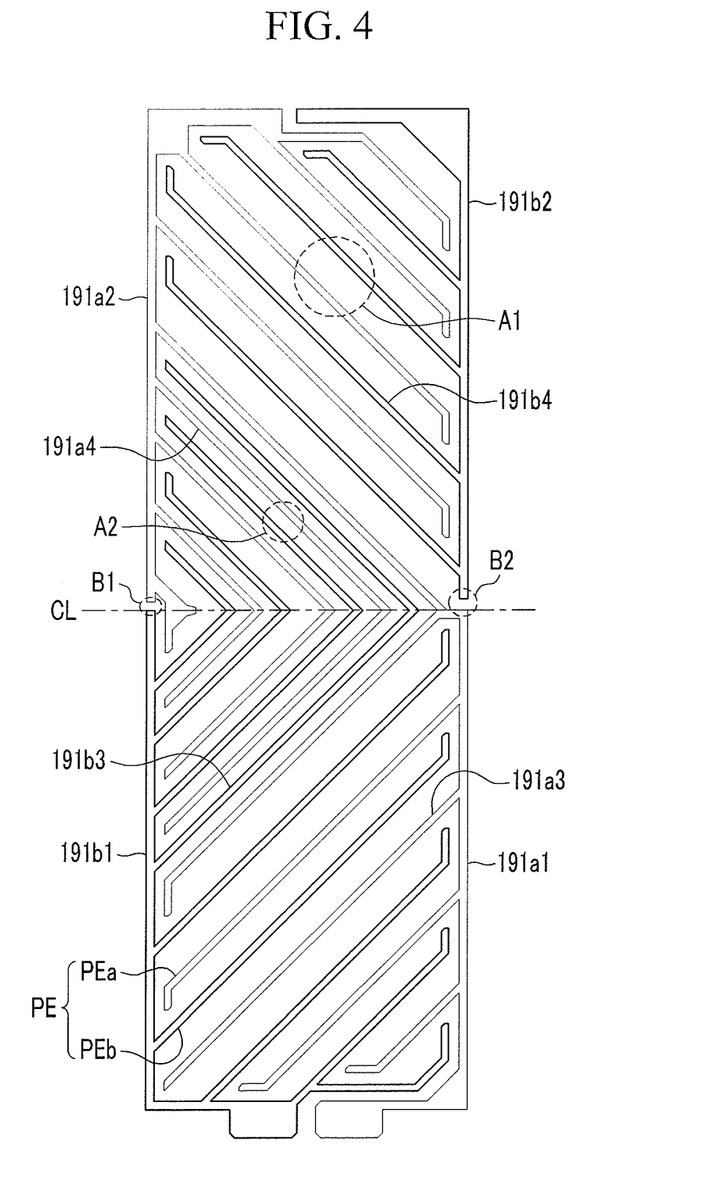
FIG. 4 is a layout view showing a shape of a pixel of a liquid crystal display according to an exemplary embodiment of the present invention.

Next, the shape of the first and second pixel electrodes PEa and PEb of one pixel PX of the liquid crystal panel assembly according to an exemplary embodiment of the present invention will be described with reference to FIG. 4. FIG. 4 is a layout view showing a shape of a pixel of a liquid crystal display according to an exemplary embodiment of the present invention.

As shown in FIG. 4, the overall contour of the one pixel electrode PE has a quadrangle shape. The first and second pixel electrodes PEa and PEb engage with each other with a gap therebetween, and include a plurality of branches and a stem connecting the plurality of branches. The first and second pixel electrodes PEa and PEb are generally vertically symmetrical with each other around a virtual transverse center line CL which divides the pixel electrode into upper and lower regions.

The first pixel electrode PEa includes a lower stem 191$a$1 and an upper stem 191$a$2, and a plurality of first branches 191$a$3 and a plurality of second branches 191$a$4 extending from the lower stem 191$a$1 and the upper stem 191$a$2. The second pixel electrode PEb includes a lower stem 191$b$1, an upper stem 191$b$2, a plurality of third branches 191$b$3, and a plurality of fourth branches 191$b$4 extending from the lower stem 191$b$1 and the upper stem 191$b$2.

The lower stem 191$a$1 and the upper stem 191$a$2 of the first pixel electrode PEa are disposed on the left and right sides of one pixel electrode PE respectively, and the lower stem 191$b$1 and the upper stem 191$b$2 of the second pixel electrode PEb are disposed on the left and right sides of one pixel electrode PE, respectively.

The magnitude of the parasitic capacitances that are generated between the data line or the power source supply line that are disposed on the right and left sides of one pixel electrode PE, and the pixel electrode PE, may be symmetrical. The magnitudes of the parasitic capacitances between the first pixel electrode PEa and the second pixel electrode PEb, and the right and left signal lines, may be equal to each other. Accordingly, crosstalk deterioration due to a deviation of the right and left parasitic capacitances may be prevented.

An angle between the plurality of branches of the first pixel electrode PEa and second pixel electrode PEb and the transverse center line CL may be approximately 45 degrees.

The branches of the first and second pixel electrodes PEa and PEb engage with each other with a predetermined gap therebetween and are alternately disposed, thereby forming a pectinated pattern.

However, the shape of the first and second pixel electrodes PEa and PEb of one pixel PX of the liquid crystal panel assembly is not limited to the shape described above. The pixel electrode PE may take any shape in which at least portions of the first and second pixel electrodes PEa and PE are formed with the same layer and are alternately arranged.

Figure 5:
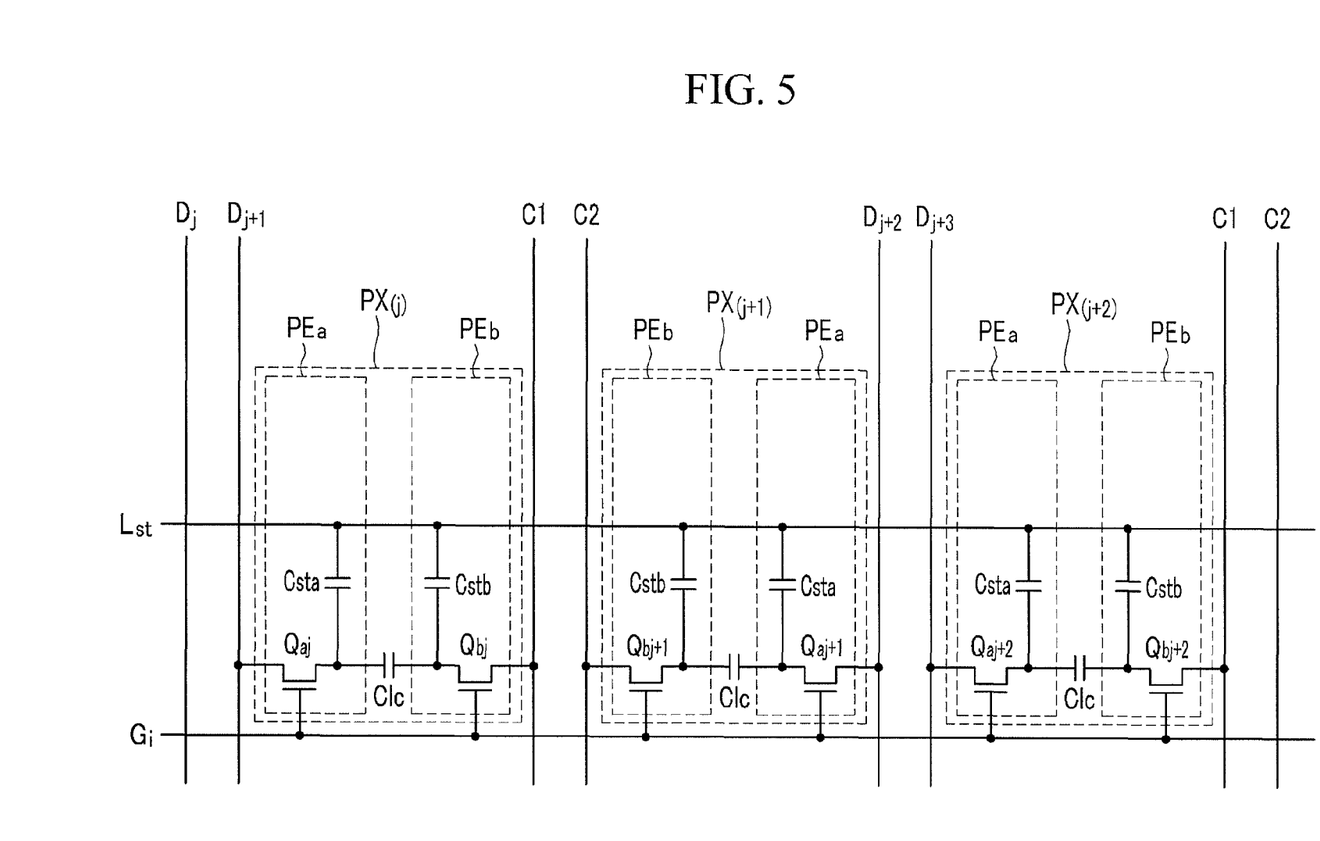
FIG. 5 is an equivalent circuit diagram of three pixels in a liquid crystal display according to an exemplary embodiment of the present invention.

Next, signal lines and an arrangement thereof, and a driving method of a liquid crystal display according to an exemplary embodiment of the present invention, will be described with reference to FIG. 5 as well as FIG. 2. FIG. 5 is an equivalent circuit diagram of three pixels in a liquid crystal display according to an exemplary embodiment of the present invention.

Referring to FIG. 2 and FIG. 5, a liquid crystal display according to an exemplary embodiment includes a plurality of first pixels PX(j), a plurality of second pixels PX(j+1), and a plurality of third pixels PX(j+2) that neighbor each other in a pixel row direction, and a plurality of signal lines Gi, Lst, Dj, D(j+1), D(j+2), D(j+3), C2, and C1 connected thereto.

The signal lines Gi, Lst, Dj, D(j+1), D(j+2), D(j+3), C2, and C1 include a plurality of gate lines Gi transmitting gate signals (referred to as "scanning signals"), a storage voltage line Lst transmitting a predetermined storage voltage, a plurality of pairs of data lines Dj and D(j+1), and D(j+2) and D(j+3), transmitting data voltages, and a plurality of pairs of power source supply lines C1 and C2 transmitting the predetermined first voltage and second voltage.

The first pixel PX(j) (i=1, 2, . . . , n) includes a first switching element Qaj and a second switching element Qbj connected to the gate line Gi, the second data line D(j+1) of the first pair of data lines Dj and D(j+1), and the first power source supply line of the power source supply lines C1 and C2, and a liquid crystal capacitor Clc connected thereto. Also, the first pixel PX(j) (i=1, 2, . . . , n) may further include the first storage capacitor Csta and the second storage capacitor Cstb connected between the liquid crystal capacitor and the storage voltage line Lst.

The first switching element Qaj and the second switching element Qbj are each three-terminal elements such as a thin film transistor and the like. The control terminal of the first switching element Qaj is connected to the gate line Gi. The input terminal is inputted to the first data line D(j+1). The output terminal is connected to the liquid crystal capacitor Clc. The control terminal of the second switching element Qbj is connected to the gate line Gi. The input terminal is connected to the first power source supply line C1 of the plurality of pairs of power source supply lines C1 and C2. The output terminal is connected to the liquid crystal capacitor Clc.

The second pixel PX(j+1) that is adjacent to the first pixel PX(j) in a pixel row direction includes a first switching element Qa(j+1) and a second switching element Qb(j+1), each connected to the gate line Gi. The second pixel PX(j+2) also include the third data line D(j+2), of the second pair of data lines D(j+2) and D(j+3), and the second power source supply line C2, of the power source supply lines C1 and C2, and the liquid crystal capacitor Clc connected thereto. Also, the second pixel PX(j+1) may further include the first storage capacitor Csta and the second storage capacitor Cstb connected between the liquid crystal capacitor and the storage voltage line Lst.

The first switching element Qa(j+1) and the second switching element Qb(j+1) are each a three-terminal element such as a thin film transistor and the like. The control terminal is connected to the gate line Gi, the input terminal is connected to the data line D(j+2), and the output terminal is connected to the liquid crystal capacitor C1c. The control terminal of the second switching element Qb(j+1) is connected to the gate line Gi, the input terminal is connected to the second power source supply line C2, and the output terminal is connected to the liquid crystal capacitor C1c.

The third pixel PX(j+2) (j=1, 2, . . . , n) that is adjacent to the second pixel PX(j+1) in the pixel row direction includes the first switching element Qa(j+2) and the second switching element Qb(j+2), each of which are connected to the gate line Gi. The third pixel PC(j+2) also includes the fourth data line D(j+3), of the second pair of data lines D(j+2) and D(j+3), and the first power source supply line C1, of the power source supply lines C1 and C2, and the liquid crystal capacitor C1c connected thereto. Also, the first storage capacitor Csta and the second storage capacitor Cstb connected between the liquid crystal capacitor and the storage voltage line Lst may be further included.

The first switching element Qa(j+2) and the second switching element Qb(j+2) are each a three-terminal element such as a thin film transistor and the like. The control terminal is connected to the gate line Gi, the input terminal is input to the data line D(j+3), and the output terminal is connected to the liquid crystal capacitor C1c. The control terminal of the second switching element Qb(j+1) is connected to the gate line Gi, the input terminal is connected to the first power source supply line C1, and the output terminal is connected to the liquid crystal capacitor C1c.

Although not shown, the first power source supply lines C1, among the plurality of pairs of power source supply lines C1 and C2, are connected to each other thereby receiving the same first voltage. The second power source supply lines C2, among the plurality of pairs power source supply lines C1 and C2, are connected to each other thereby receiving the same second voltage. The polarities of the first voltage and the second voltage applied to the first power source supply line C1 and the second power source supply line C2 are different from each other with respect to the reference voltage Vref. For example, in the case of when the reference voltage Vref is 7V, the first voltage may be about 14V or more and the second voltage may be about 0V or less, and vice versa. Accordingly, one of the first and second voltages is greater than the reference voltage, and the other of the first and second voltages is less than the reference voltage by an equivalent amount.

Figure 6:
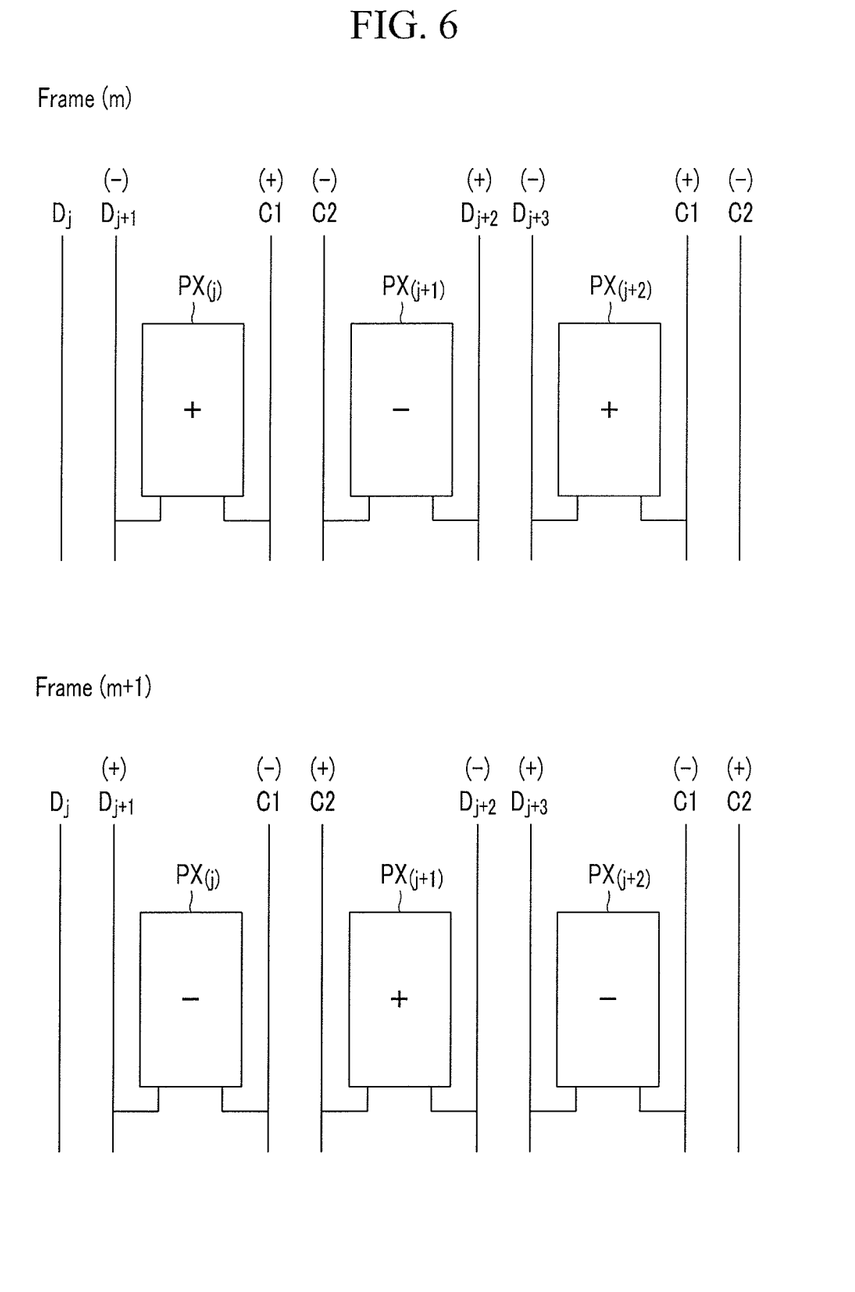
FIG. 6 is a view showing a polarity of a voltage applied to a signal line and a voltage charged to a pixel in the liquid crystal display shown in FIG. 5.

An example of the driving method of the liquid crystal display according to an exemplary embodiment will be described in detail with reference to FIG. 6 as well as FIG. 2 and FIG. 5. FIG. 6 is a view showing a polarity of a voltage applied to a signal line and a voltage charged to a pixel in the liquid crystal display shown in FIG. 5.

Referring to FIG. 6 as well as FIG. 2 and FIG. 5, in the m-th frame, i.e. "frame (m)", if the gate line Gi is applied with the gate on voltage, the first data voltage is applied to the first pixel PX(j) through the turned-on first switching element Qaj of the first pixel PX(j), and the first voltage is applied to the first pixel PX(j) through the turned-on second switching element Qbj of the first pixel PX(j). Also, the second data voltage is applied to the second pixel PX(j+1) through the turned-on first switching element Qa(j+1) of the second pixel PX(j+1), the second voltage is applied to the second pixel PX(j+1) through the turned-on second switching element Qb(j+1) of the second pixel PX(j+1). The third data voltage is applied to the third pixel PX(j+2) through the turned-on first switching element Qa(j+2) of the third pixel PX(j+2), and the first voltage is applied to the first pixel PX(j) through the turned-on second switching element Qb(j+2) of the third pixel PX(j+2).

For example, the first data voltage flowing to the data line Dj+1 is applied to the first pixel electrode PEa of the first pixel PX(j) through the first switching element Qaj, and the first voltage flowing to the first power source supply line C1 is applied to the second pixel electrode PEb through the second switching element Qbj. Here, the difference between the data voltage flowing to the data line D(j+1) and the first voltage is the charged voltage of the liquid crystal capacitor Clc of the first pixel PX(j). The first data voltage and the first voltage applied to the first pixel electrode PEa and the second pixel electrode PEb of the first pixel PX(j) are the voltages corresponding to the luminance that is displayed by the first pixel PX(j), and are opposites with respect to the reference voltage Vref.

Also, the first pixel electrode PEa of the second pixel PX(j+1) is applied with the second data voltage flowing to the data line D(j+2) through the first switching element Qa(j+1), and the second pixel electrode PEb is applied with the second voltage flowing to the second power source supply line C2 through the second switching element Qb(j+1). Here, the difference between the data voltage flowing to the data line D(j+2) and the second voltage is the charged voltage of the liquid crystal capacitor C1c of the second pixel PX(j+1). The second data voltage and the second voltage applied to the first pixel electrode PEa and the second pixel electrode PEb of the second pixel PX(j+1) are the voltages corresponding to the luminance that is displayed by the second pixel PX(j+1), and are opposites with respect to the reference voltage Vref.

Also, the first pixel electrode PEa of the third pixel PX(j+2) is applied with the third data voltage flowing to the data line D(j+3) through the first switching element Qa(j+2), and the second pixel electrode PEb is applied with the first voltage flowing to the first power source supply line C1 through the second switching element Qb(j+2). Here, the difference between the data voltage flowing to the data line D(j+1) and the first voltage is the charged voltage of the liquid crystal capacitor C1c of the second pixel PX(j+2).

According to an exemplary embodiment, the polarity of the first data voltage is negative (−), and the polarity of the first voltage is positive (+). Also, the polarity of the second data voltage is positive (+), and the polarity of the second voltage is negative (−). The polarity of the third data voltage is negative (−). When the polarity of the voltage applied to the first pixel electrode PEa is negative (−), the polarity of the voltage applied to the second pixel electrode PEb is positive (+), and the polarity of the pixel voltage charged to the pixel is positive (+), the polarity represented by the first pixel PX(j) is positive (+), the polarity represented by the second pixel PX(j+1) is negative (−), and the polarity represented by the third pixel PX(j+2) is positive (+). Accordingly, the polarity of the pixel voltage charged to the first pixel PX(j), the second pixel PX(j+1), and the third pixel PX(j+2) that are disposed in the pixel row is changed during one frame, thereby forming dot inversion.

Next, in the (m+1)-th frame, i.e. "frame (m+1)", the polarity of the voltage applied to the data lines D(j+1), D(j+2), and D(j+3), and the first power source supply lines C1 and the second power source supply line C2, may be opposite to each other. For example, the polarity represented by the first pixel PX(j) may be negative (−), the polarity represented by the second pixel PX(j+1) may be positive (+), and the polarity represented by the third pixel PX(j+2) may be negative (−).

A pair of power source supply lines C1 and C2 or a pair of data lines D(j+2) and D(j+3) that are applied with the voltages having the different polarities are disposed between two neighboring pixels PX(j) and PX(j+1), and PX(j+1) and PX(j+2), of the liquid crystal display according an exemplary embodiment.

As shown in FIG. 6, the polarity of the first voltage is positive (+) and the polarity of the second voltage is negative (−), however, alternatively, the polarities of the first voltage and the second voltage may be opposite to this.

Generally, one pixel is divided into two pixel electrodes PEa and PEb, for example, as described above, and the voltages having different polarities are applied through different switching elements. One pixel is connected to one gate line and two different data lines for charging the voltage of the desired magnitude to the liquid crystal capacitor C1c. For example, the first and second switching elements connected to the first and second pixel electrodes of each are connected to the same gate line but are connected to different data lines such that they receive the data voltages through different data lines.

However, one pixel of the liquid crystal display according to an exemplary embodiment is connected to one gate line, one data line, and one power source supply line. Accordingly, the number of data lines may be reduced and thereby the cost of the driver of the liquid crystal display may be reduced. According to this arrangement of the liquid crystal display, as compared with the general signal lines and pixel arrangement, two power source supply lines are added, however the power source supply lines are applied with the first voltage or the second voltage having the same magnitude such that the simple driver to apply the uniform voltage is added, and accordingly the driving method is simple and the manufacturing cost is low.

Next, a movement of liquid crystal molecules will be described with reference to FIG. 7 as well as FIG. 4 and FIG. 6. FIG. 7 is an exemplary view showing a movement of liquid crystal molecules.

Referring to FIG. 4, as described above, the stems of the first pixel electrode PEa and the second pixel electrode PEb of the pixel electrode PE according to an exemplary embodiment of the present invention are all disposed on the right and left sides of the pixel electrode PE. By this, the magnitudes of the parasitic capacitance between the first pixel electrode PEa and the second pixel electrode PEb, and the right and left signal lines, may be equal to each other, and the cross-talk generated by the parasitic capacitance deviation may thereby be prevented.

The stems of the first pixel electrode PEa have the second stems 191a2 and the first stems 191a1 that are disposed on the upper and lower portions of the pixel area, and the stems of the second pixel electrode PEb have the second stems 191b2 and the first stems 191b1 that are disposed on the upper and lower portions of the pixel area. Accordingly, a portion that is not connected to the stems 191a1, 191a2, 191b1, and 191b2 may exist. In detail, the openings B1 and B2 that are not enclosed by the stems 191a1 and 191a2 of the first pixel electrode PEa and the stem 191b1 and 191b2 of the second pixel electrode PEb exist on the right and left sides of the pixel electrode PE according to an exemplary embodiment of the present invention. The liquid crystal molecules disposed in the openings B1 and B2 may be irregularly moved by the affect of the pixel voltage applied between two pixel electrodes PEa and PEb and the data line or the voltage application line to apply the signals to the adjacent pixel. This irregular movement may generate a display deterioration such as texture.

Figure 7A:
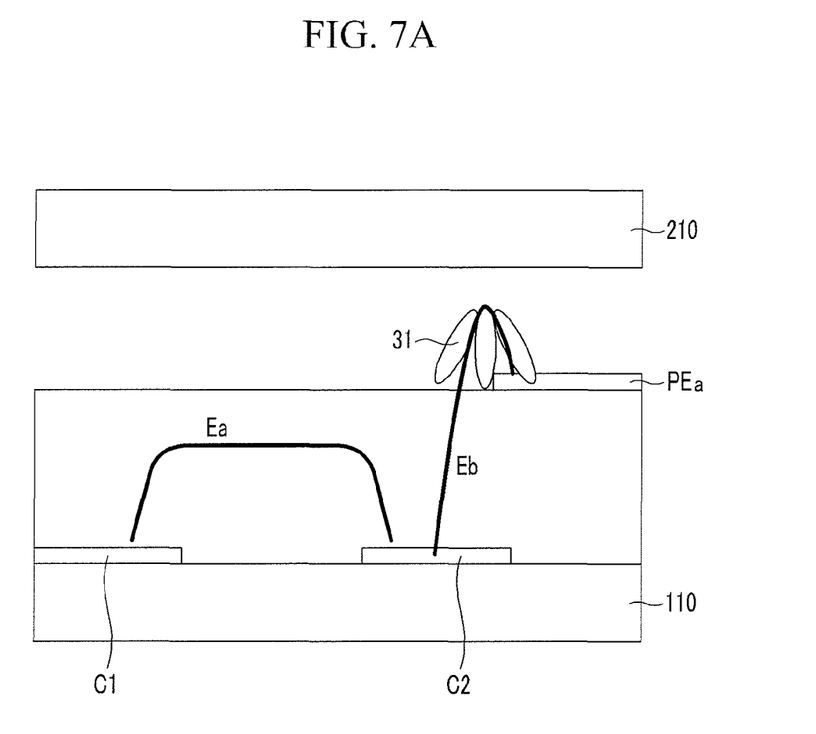
FIG. 7 is an exemplary view showing movement of liquid crystal molecules.
Figure 7B:
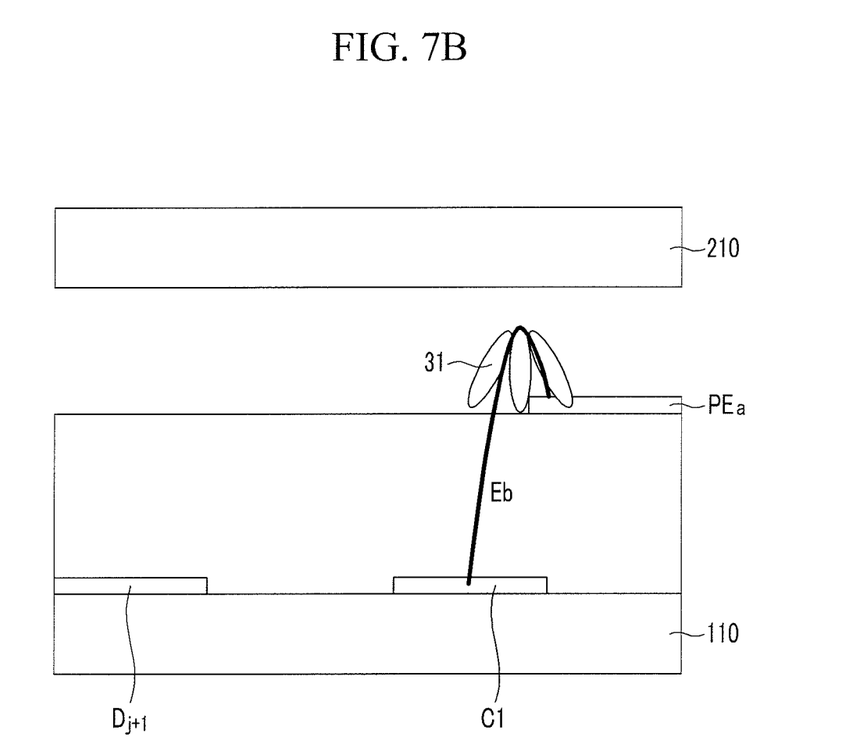

Next, the movement of the liquid crystal molecules will be described with reference to FIG. 6, FIG. 7A, and FIG. 7. FIG. 7A and FIG. 7b show a portion of the pixel.

The second pixel PX(j+1) will be described with reference to FIG. 6, FIG. 7A, and FIG. 7B. The first power source supply line C1 and the second power source supply line C2 are applied with the first voltage of the positive polarity and the second voltage having the negative polarity in the m-th frame, respectively. The first pixel PE of the second pixel PX(j+1) is applied with the second voltage having the negative polarity. Next, in the (m+1)-th frame, the first power source supply line C1 and the second power source supply line C2 are applied with the first voltage having the negative polarity and the second voltage having the positive polarity.

Here, a first horizontal electric field Eb is generated between the first pixel PEa charged with the voltage of the negative polarity and the second power source supply line C2 applied with the second voltage having the positive polarity. The horizontal electric field Eb generates irregular movement of the liquid crystal molecules during the change of the frame. Particularly, the horizontal electric field Eb affects the liquid crystal molecules disposed in the openings B1 and B2 of the pixel electrode PE shown in FIG. 4. The irregular movement of the liquid crystal molecules is generated between the frames if an external pressure is not applied, and affects the movement of the liquid crystal molecules during the following frame such that the deterioration of the display quality such as texture may be recognized.

However, by the liquid crystal display according to an exemplary embodiment of the present invention, the first power source supply line C1 and the second power source supply line C2 receiving the voltages having the different polarities are disposed in pairs between two pixels. As shown in FIG. 7A, the second horizontal electric field Ea may be generated between the first power source supply line C1 and the second power source supply line C2. The second horizontal electric field Ea may offset the first horizontal electric field Eb in the opposite direction, and accordingly the irregular movement of the liquid crystal molecule may be prevented.

Although not shown, the liquid crystal molecules disposed in the opening of two pixels disposed on both sides of two data lines applied with the data voltage having the different polarities may have the irregular movement by the effect of the first horizontal electric field Eb without the external pressure. However, two data lines applied with the data voltage having the different polarities are adjacent to each other such that the second horizontal electric field Ea may be generated between the two data lines, and thereby the irregular movement of the liquid crystal molecules may be prevented.

In general, in the case of the liquid crystal display, to apply the data signal and the first voltage or the second voltage having the predetermined magnitude to one pixel area, the data line and the power source supply line are alternately disposed. In this case, one data line D(j+1) and one power source supply line C2 are disposed between two adjacent pixels, and the data line D(j+1) and the power source supply line C2 are applied with the voltage having the same polarity. Accordingly, as shown in FIG. 7B, the first horizontal electric field Eb is generated between the first pixel PEa and the second power source supply line C2 between the frames, and the second horizontal electric field Ea is not generated between the data line D(j+1) and the power source supply line C2.

However, as described above, the liquid crystal display according to an exemplary embodiment of the present invention disposes two signal lines applied with the voltage having the different polarities between two adjacent pixels to induce the second horizontal electric field Eb such that the irregular movement of the liquid crystal molecules may be prevented between the frames.

In this way, a pair of power source supply lines C1 and C2 applied with the voltages having the different polarities or a pair of data lines D(j+2) and D(j+3) applied with the voltages having the different polarities are disposed between two adjacent pixels PX(j) and PX(j+1), and PX(j+1) and PX(j+2).

Accordingly, the deterioration of the display quality according to the irregular movement of the liquid crystal molecules generated on both edges of the central part of the pixel electrode PE may be prevented.

As described above, the signal lines, the pixel arrangement, and the driving methods of the liquid crystal display according to an exemplary embodiment may be applied to all shapes of pixels including the first pixel electrode and the second pixel electrode of which at least portions are formed with the same layer and are alternately arranged.

While exemplary embodiments of the present invention have been described above with reference to the figures, it is to be understood that the invention is not limited to the disclosed embodiments, but, on the contrary, is intended to cover various modifications and equivalent arrangements.

What is claimed is:

1. A liquid crystal display, comprising:
   a gate line formed on a first substrate and transmitting a gate signal;
   a first data line and a second data line formed on the first substrate;
   a first power source supply line and a second power source supply line formed on the first substrate;
   a first switching element connected to the gate line and the first data line;
   a second switching element connected to the gate line and the first power source supply line;
   a third switching element connected to the gate line and the second data line;
   a fourth switching element connected to the gate line and the second power source supply line;
   a first pixel electrode connected to the first switching element and the second switching element; and
   a second pixel electrode connected to the third switching element and the fourth switching element and adjacent to the first pixel electrode,
   wherein the first power source supply line is supplied with a first voltage having a predetermined magnitude and the second power source supply line is supplied with a second voltage also having the predetermined magnitude.

2. The liquid crystal display of claim 1, wherein the first power source supply line and the second power source supply line are disposed as a pair between the first pixel electrode and the second pixel electrode.

3. The liquid crystal display of claim 1, further comprising:
   a second substrate facing the first substrate; and
   a liquid crystal layer interposed between the first and second substrates.

4. The liquid crystal display of claim 1, wherein the polarities of the first voltage and the second voltage are different from each other.

5. The liquid crystal display of claim 1, wherein:
   the first pixel electrode includes a first sub-pixel electrode and a second sub-pixel electrode;
   the second pixel electrode includes a third sub-pixel electrode and a fourth sub-pixel electrode;
   the first sub-pixel electrode is connected to the first switching element;
   the second sub-pixel electrode is connected to the second switching element;
   the third sub-pixel electrode is connected to the third switching element; and
   the fourth sub-pixel electrode is connected to the fourth switching element.

6. The liquid crystal display of claim 5, wherein the first sub-pixel electrode and the second sub-pixel electrode are separated from each other, and wherein the third sub-pixel electrode and the fourth sub-pixel electrode are separated from each other.

7. The liquid crystal display of claim 5, wherein:
   the first sub-pixel electrode and the second sub-pixel electrode each include a plurality of branch electrodes; and the branch electrodes of the first sub-pixel electrode and the branch electrodes of the second sub-pixel electrodes are alternately disposed.

8. The liquid crystal display of claim 7, wherein:
the first sub-pixel electrode further includes a stem connecting the plurality of branch electrodes of the first sub-pixel electrode;
the stem includes a first stem disposed on the lower portion of the pixel electrode and a second stem disposed on the upper portion of the pixel electrode;
the first stem and the second stem are disposed on both sides of the pixel electrode;
the first stem overlaps one of the first data line and the first power source supply line; and
the second stem overlaps the other of the first data line and the first power source supply line.

9. The liquid crystal display of claim 8, wherein:
the second sub-pixel electrode further includes a stem connecting the plurality of branch electrodes of the second sub-pixel electrode;
the stem includes a third stem disposed on the lower portion of the pixel electrode and a fourth stem disposed on the upper portion of the pixel electrode;
the third stem and the fourth stem are disposed on both sides of the pixel electrode;
the third stem overlaps one of the first data line and the first power source supply line; and
the fourth stem overlaps the other of the first data line and the first power source supply line.

10. The liquid crystal display of claim 7, wherein
the first pixel electrode has an opening that is not enclosed by any of the first stem, the second stem, the third stem, and the fourth stem.

11. The liquid crystal display of claim 10, wherein
the opening is disposed on opposing sides of a center of the first pixel electrode.

12. The liquid crystal display of claim 11, wherein,
when the gate line is applied with a gate on signal:
the first sub-pixel electrode is applied with a first data voltage through the first data line, the second sub-pixel electrode is applied with a first voltage through the first power source supply line;
the third sub-pixel electrode is applied with a second data voltage through the second data line, and the fourth sub-pixel electrode is applied with a second voltage through the second power source supply line; and
the polarities of the first data voltage and the second data voltage are different from each other.

13. The liquid crystal display of claim 1, further comprising:
a third data line close to the second data line and applied with a third data voltage; and
a third pixel electrode connected to the third data line,
wherein the second data line and the third data line are disposed as a pair between the second pixel electrode and the third pixel electrode.

14. The liquid crystal display of claim 13, wherein
the second data voltage and the third data voltage have different polarities.

15. A method for forming a liquid crystal display, comprising:
forming a gate line on a first substrate;
forming a first data line and a second data line on the first substrate;
forming a first power source supply line and a second power source supply line on the first substrate;
forming a first switching element connected to the gate line and the first data line;
forming a second switching element connected to the gate line and the first power source supply line;
forming a third switching element connected to the gate line and the second data line;
forming a fourth switching element connected to the gate line and the second power source supply line;
forming a first pixel electrode connected to the first switching element and the second switching element; and
forming a second pixel electrode connected to the third switching element and the fourth switching element and adjacent to the first pixel electrode,
wherein the first power source supply line and the second power source supply line are disposed as a pair between the first pixel electrode and the second pixel electrode.

16. The method of claim 15, wherein
the first pixel electrode is formed to include a first sub-pixel electrode and a second sub-pixel electrode separated from each other;
the second pixel electrode is formed to include a third sub-pixel electrode and a fourth sub-pixel electrode separated from each other;
the first sub-pixel electrode is formed connected to the first switching element;
the second sub-pixel electrode is formed connected to the second switching element;
the third sub-pixel electrode is farmed connected to the third switching element; and
the fourth sub-pixel electrode is formed connected to the fourth switching element.

17. The method of claim 15, wherein the first sub-pixel electrode and the second sub-pixel electrode are each formed to include a plurality of branch electrodes; and
the branch electrodes of the first sub-pixel electrode and the branch electrodes of the second sub-pixel electrodes are alternately disposed.

18. The method of claim 17, wherein:
the first sub-pixel electrode is formed to further include a stem connecting the plurality of branch electrodes of the first sub-pixel electrode;
the stem is foil led to include a first stem disposed on the lower portion of the pixel electrode and a second stem disposed on the upper portion of the pixel electrode;
the first stem and the second stem are disposed on both sides of the pixel electrode;
the first stem is formed overlapping one of the first data line and the first power source supply line; and
the second stem is formed overlapping the other of the first data line and the first power source supply line.

19. A liquid crystal display, comprising:
a first, second and third pixel, each of which including a first pixel electrode and a second pixel electrode together forming a liquid crystal capacitor with a liquid crystal layer disposed therebetween;
the first pixel electrode of the first pixel being connected to a first data line;
the second pixel electrode of the first pixel being connected to a first power supply line;
the second pixel electrode of the second pixel being connected to a second power supply line that is adjacent to the first power supply line;
the first pixel electrode of the second pixel being connected to a second data line;
the first pixel electrode of the third pixel being connected to a third data line that is adjacent to the second data line; and the second pixel electrode of the third pixel being connected to the first power supply line.

20. The liquid crystal display of claim 19, wherein the first power supply line receives a first power supply voltage and the second power supply line receives a second power supply voltage, and wherein the first power supply voltage and the second power supply voltage are of opposite polarities with respect to a reference voltage.

* * * * *